Dec. 24, 1968 W. L. WATKINS ET AL 3,417,555
AUTOMATIC TABLE HEIGHT CONTROL
Filed Sept. 24, 1965 3 Sheets-Sheet 3
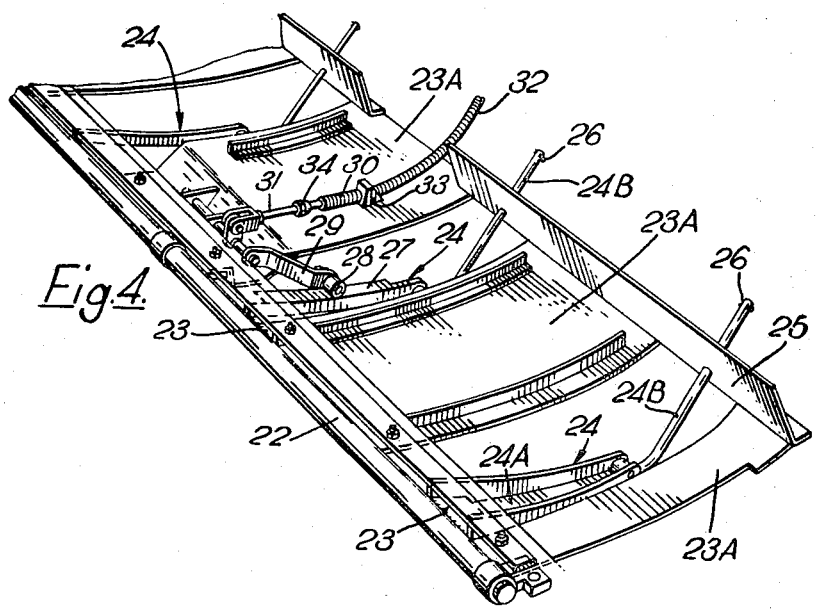
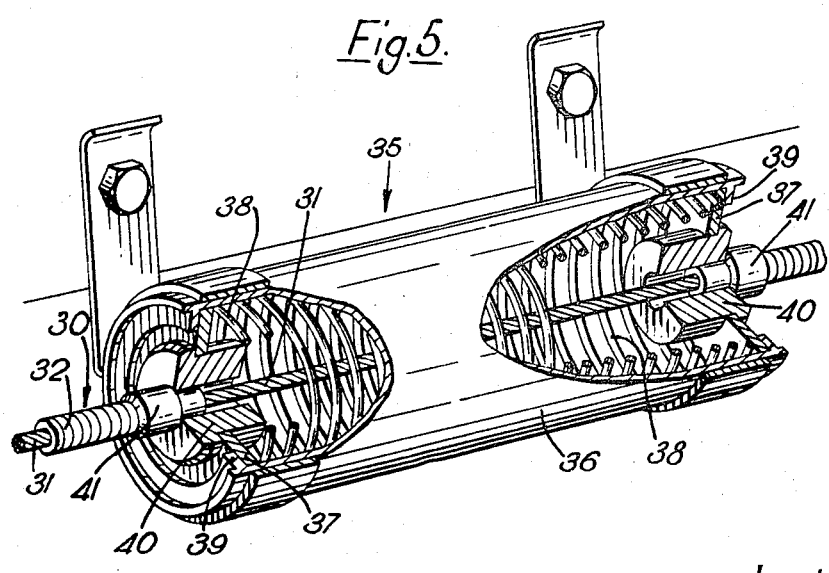
Inventors
WILFRED LEONARD WATKINS &
LESLIE LYONS KEPKAY
By
Tweedale and Gerhardt
Attorneys United States Patent Office 3,417,555
Patented Dec. 24, 1968

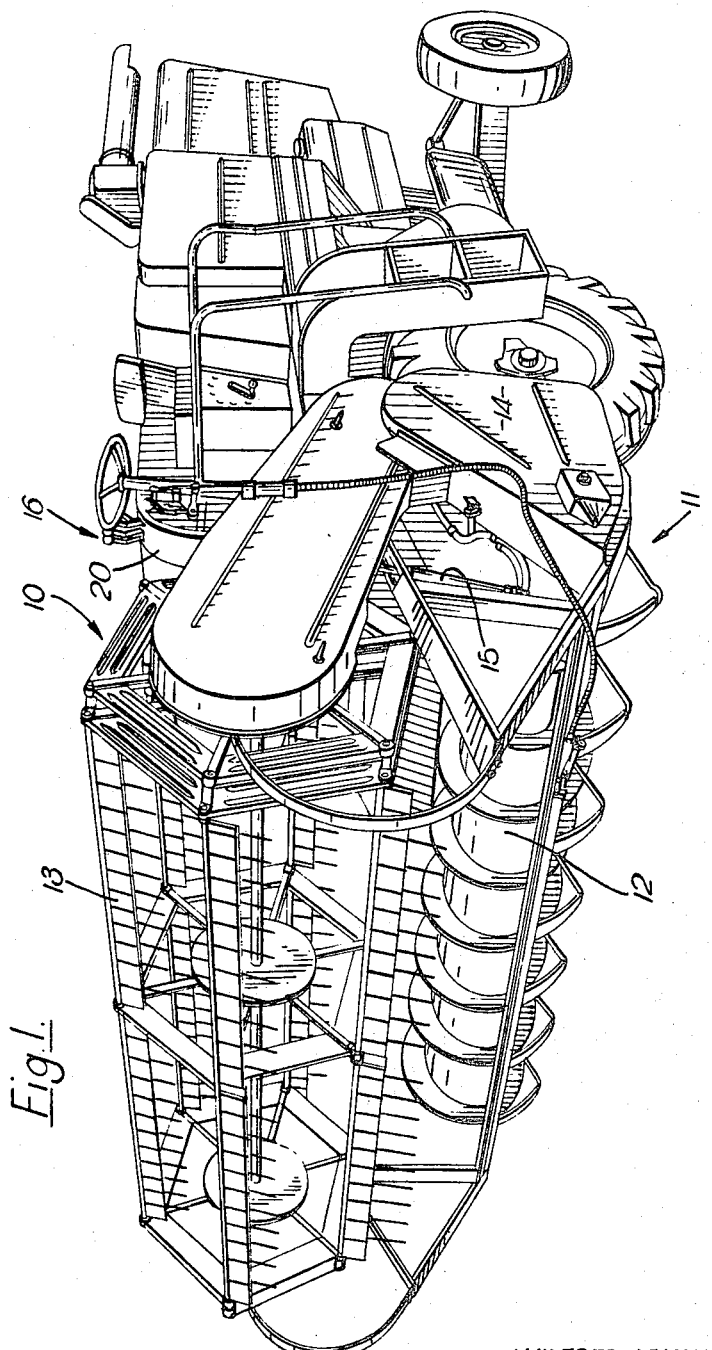

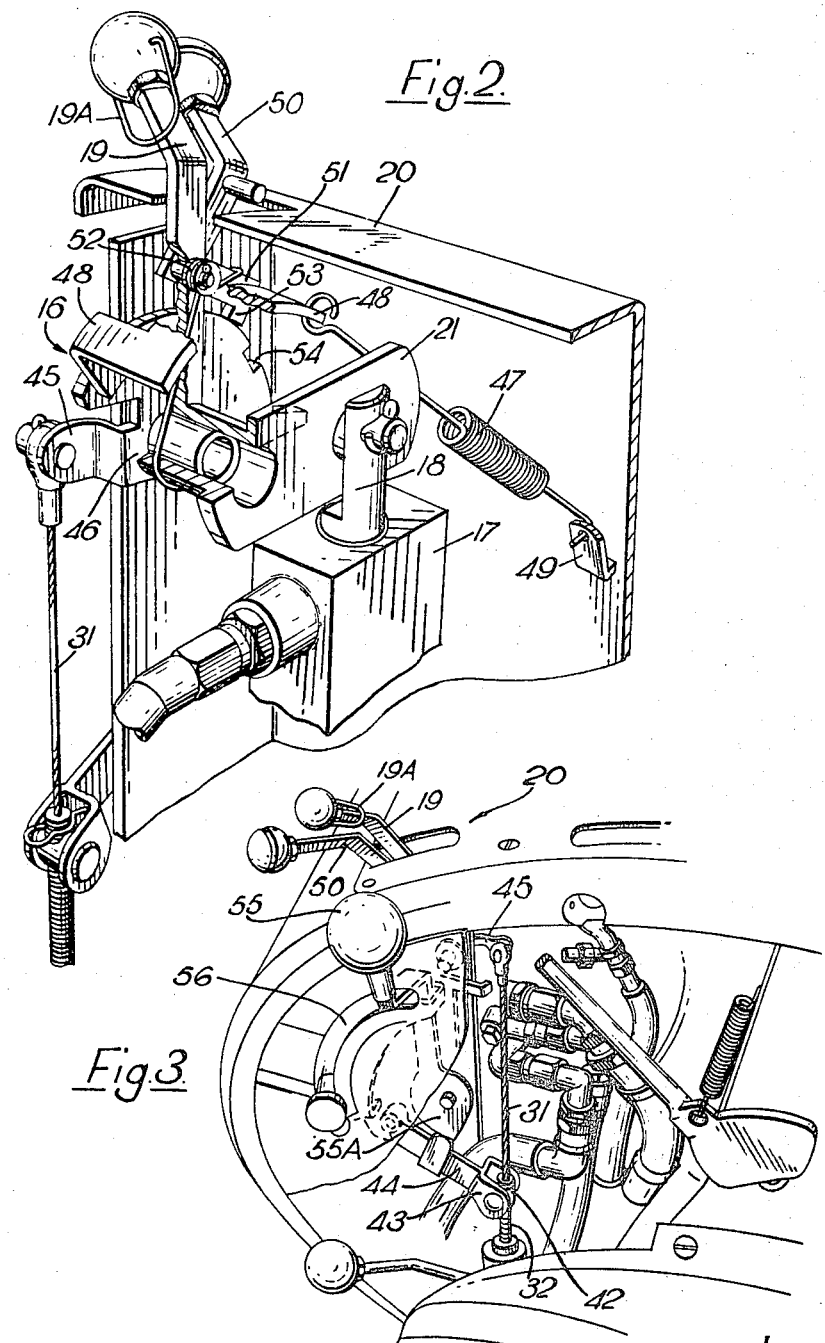

3,417,555
AUTOMATIC TABLE HEIGHT CONTROL
Wilfred L. Watkins Earlsdon, Coventry, and Leslie L. Kepkay, Leamington Spa., England, assignors to Massey-Ferguson Service N.V., Curacao, Netherlands Antilles
Filed Sept. 24, 1965, Ser. No. 489,948
Claims priority, application Great Britain, Sept. 24, 1964, 38,917/64
7 Claims. (Cl. 56—208)

ABSTRACT OF THE DISCLOSURE

Mechanism for sensing changes in ground contour and automatically adjusting the height of a combine harvesting table accordingly. Feeler members are pivotally mounted beneath the harvesting table and are biased into engagement with the ground. An actuating lever engages one of the feeler members and actuates a control valve to hydraulically raise and lower the table in response to the pivotal movement of the feeler members relative to the harvesting table caused by undulations in the ground surface.

---

This invention relates to apparatus for crop machines which have a gathering unit which, in use is required to follow the ground contour.

Machines having gathering units include for example corn pickers, cane harvesters and combine harvesters. For the sake of clarity, the term "combine harvester" will be used hereinafter and in the appended claims and it is intended that this term should cover all crop machines as stated above.

In a combine harvester, the gathering unit which is a grain table or cutting head is height-adjustable so that it may be preset at different cutting heights above the ground.

In such a combine harvester, there is a hydraulic ram between the grain table and the main frame of the combine, and hydraulic fluid is supplied to the hydraulic ram through a manually operable control valve positioned so as to be accessible to the combine operator.

An object of the present invention is to provide means for a combine harvester whereby after the grain table has been preset to the desired cutting height, the grain table automatically adjusts itself in response to variations in the level of the ground on which the combine is being used so that the preset cutting height remains substantially constant relative to the ground.

Accordingly, the invention is, for a combine harvester apparatus for automatically adjusting the height of the grain table comprising ground engaging feeler means adapted to be connected to the combine harvester and a signal transmitting actuator operatively connected to the feeler means and adapted to be operatively connected to said manually operable control valve so as automatically to actuate the latter after the cutting height has been preset and cause the table to be raised or lowered relative to said main frame when the feeler means detects a change in ground level, whereby the cutting height remains substantially constant relative to the ground.

Preferably, the feeler means comprises a plurality of articulated fingers, one end of each finger being secured to a pivot rod adapted to extend transversely of the combine and the other end being slidably supported in a bar spaced rearwardly of the rod and parallel thereto.

Preferably also, the signal transmitting actuator comprises a Bowden cable connected to the feeler means through a device which moves in accordance with movement of the feeler means. Further, the invention is a combine harvester including apparatus as aforesaid.

An embodiment of the invention will now be described by way of example, with reference to the accompanying drawings in which:

FIG. 1 is a perspective view of a combine harvester of the type aforesaid and according to the present invention, FIG. 2 is a perspective view of the table height control valve taken from the rear with certain parts being broken away for clarity;

FIG. 3 is a perspective elevational view of the actuating and adjustment mechanism for the table height control valves;

FIG. 4 is a perspective view of a ground contour sensing mechanism; and

FIG. 5 is a perspective view of an overload shock spring assembly for the sensing mechanism.

Referring to the drawings, a combine harvester 10 has a grain table or cutting head generally indicated at 11 and pivotally mounted on the combine main frame.

The grain table 11 is provided with a mower blade (not shown) a cut crop auger 12, a reel 13, and an elevator 14 which delivers cut crop to the first treating stage within the combine.

When it is desired to cut crop, the grain table is lowered so that the mower blade passes close to the ground and cuts the crop. The reel 13 sweeps cut crop to the auger 12 which delivers it to the elevator 14.

Control of the raising and lowering of the grain table 11 is effected by a hydraulic ram 15 supplied with pressure fluid through a control valve 16. The control valve 16 has an upright, chamfered valve body 17 (FIG. 2) having a vertically disposed spool, the upper end of which is shown at 18. Movement of spool 18 in a downward direction causes hydraulic fluid to be exhausted from the ram 15 and allows the table 11 to pivot downwards. Conversely, upward movement of the spool 18 communicates the pressure fluid with the ram 15 to lift the grain table 11.

Movement of the spool 18 is effected by an upright manual lever 19 pivotally mounted on a control console 20, the lever 19 having a substantially horizontal arm 21 connected to the spool 18. Thus, pivoting of the lever 19 effects raising or lowering of the table 11.

The combine has means for automatically controlling the height of the table 11 above the ground, the means consisting of ground engaging feeler means and a signal transmitting actuator operatively connected between the feeler means and the control valve 16.

The ground engaging feeler means (best shown in FIG. 4), consists of a transverse rod 22 pivotally mounted on the under surface of the grain table 11 directly behind the mower bar, a plurality of laterally spaced lugs 23 welded to the rod 22 and an articulated finger 24 bolted to each lug 23 in any conventional manner. Between the fingers 24 there are shields 23A. Each finger 24 consists of a tapering channel member 24A depending downwardly and a short bent rod 24B having one end loosely pivoted to the member 24A and having the other end slidably contained in an aperture in a transverse bar 25 on the grain table 11. The shields 23A extend between the rod 22 and the bar 25. The end of the bent rod 24B extending beyond the bar 25 has a retaining bolt or cotter pin 26 thereon. The bent portion of each rod 24B engages the ground.

One of the members 24A has a side flange 27 which acts as a cam for a follower roller 28 attached to the end of one arm of a bell crank lever 29 which is pivotally mounted on the grain table 11. To the other end of the other arm of the bell crank lever 29 is attached one end of the inner cable 31 of a Bowden cable 30, the outer cable 32 being held in abutting contact with a stop 33 provided on the table 11. An adjusting nut 34 is provided on the inner cable to take up initial slack.

From the feeler means, the Bowden cable 30 extends to and through an overload shock spring assembly 35 (FIG. 5), which consists of a cylindrical container 36 having a washer 37 at each end and slidable axially therein, the washer 37 being held apart by compressing spring 38 and being held in the cylinder 36 by stops 39 provided at each end. Each washer 37 supports centrally therein a collet 40 having a small central bore through which the inner cable 31 of the Bowden cable 30 passes. Each collet 40 is constructed so that a ferrule 41, which holds the end of the outer cable 32, can be held therein.

The cable 30 then passes to the control valve 16 (FIG. 3) at which point the outer cable 32 is stopped by a small drilled barrel 42 pivotally mounted within a fork 43 at the end of a pivotal arm 44. The inner cable 31 extends upwardly and is attached to a lug 45 in a cam plate 46 which is freely pivotal about an axis coaxial with the axis of pivot of the manual control lever 19. In order to counteract the torque exerted on the cam plate 46 by the inner cable 31, a tension spring 47 acts between a second lug 48 on the cam plate 46 and an anchorage 49 on the control console 20.

A second manually operable lever 50 is pivotally connected to the lever 19 and has an arm 51 which is spring-urged by a coil spring 52 into bearing engagement with the edge of the cam plate 46. A tooth 53 bears on the edge of the cam plate 46 and is engageable in a corresponding recess 54 so as to connect the cam plate 46 and the two manual levers 19 and 50.

For adjustment of the height of the table, when the automatic control is operative, there is provided a further manually operable lever 55 (FIG. 3) passing through an arcuate slot 56 in the control console 20. A cammed end 55A of the lever 55 bears against the pivotal arm 44 and when the lever 55 is turned, the effective length of the Bowden cable 30 is increased or decreased and the articulated fingers 24 pivot downwards or upwards and the table height is accordingly set.

Finally, the two handles 50 and 19 may be clipped together by a wire clip 19A on lever 19; this ensures that the tooth 53 does not engage the recess 54 when the table is under only manual control.

In operation of the device, assuming the combine table 11 to be lowered and set to operate at a predetermined height above ground level, if the tooth 53 is not engaged with the recess 54, if the harvester is travelling over untable height by manipulating the lever 19. In fact he may clip the levers 19, 50 together to prevent engagement of tooth 53 and recess 54. When the tooth 53 is engaged with the recess 54, if the harvester is travelling over uneven ground and the articulated fingers 24 sense a dip in the ground, the bell crank 29 pivots in accordance with the downward movement of the fingers 24, the Bowden cable 39 slackens and the spring 47 pivots the levers 19 and 50 so that the spool 18 drops; fluid in the ram 12 is exhausted until the table 11 drops to the required height above the ground. If the fingers 24 encounter a rise in the ground, the reverse happens, the spool 18 then being moved upwards, and the table 11 subsequently being raised. Should there be a severe dip or rise in the ground, the sudden heavy signal will be absorbed by the overload shock spring assembly 35. The control is very flexible in that the table height can be adjusted manually notwithstanding the fact that the tooth 53 is in engagement with the recess 54. In this case the manual control simply overrides the automatic control and when the operator releases the lever 19 the control device returns to the initial position. When it is required to remove the automatic control, the operator simply squeezes the levers 19 and 50 together to release the tooth 53 and recess 54.

From the above, it will be seen that, when the grain table has been pre-set to the required cutting height, this height relative to the ground may automatically be maintained substantially constant despite variations in ground level.

By virtue of the fingers 24 being supported in the bar 25 and having retaining bolts 26, the free ends of the fingers 24 are prevented from dropping into contact with the ground, during reversing or maneuvering, notwithstanding the fact that the table 11 may be in the lowered position, so that the possibility of damage to the fingers 24 in this way is avoided.

We claim:

1. In an agricultural combine having a main body with a header mounted on the forward end thereof for vertical movement, and power means for raising and lowering the header relative to the ground, automatic control means for operating said power means in accordance with changes in the contour of the ground to maintain the header at a selected minimum height above the ground comprising: a transversely disposed rod rotatably mounted beneath the header adjacent the forward end thereof; a plurality of spaced, parallel, ground engaging feeler members fixed to said rod and projecting radially therefrom in a downwardly and rearwardly direction with respect to the header; an actuating lever fulcrumed on said header; means connecting one end of said actuating lever with said power means and biasing the other end of said lever into engagement with one of said feeler members for actuating the power means to raise and lower the header in response to rotation of the transverse rod and feeler members, a guide bar mounted beneath the header in rearwardly spaced parallel relationship with said transverse rod, said feeler members each comprising an articulated finger, one end of said finger being secured to said transverse rod and the other end being slidably supported in said guide bar, and means for retaining the finger in said guide bar.

2. Apparatus according to claim 1 wherein each of said fingers comprises a channel member fixed to said transverse rod, and a bent rod pivotally connected to the channel member at its end opposite said transverse rod, the other end of said bent rod being slidably received in said guide bar.

3. Apparatus according to claim 1 in which said connecting means comprises a flexible cable connected between said actuating lever and power means.

4. An agricultural combine having a main body with a header mounted on the forward end thereof for vertical movement, power means for raising and lowering the header relative to the ground, and automatic control means for operating said power means in accordance with changes in the contour of the ground to maintain the header at a selected height above the ground, said automatic control means comprising: a transversely disposed rod rotatably mounted beneath the header adjacent the forward end thereof; a plurality of spaced, parallel, ground engaging feeler members fixed to said rod and projecting radially therefrom in a downwardly and rearwardly extending direction with respect to the header, a guide bar mounted beneath the header in rearwardly spaced, parallel relationship with said transverse rod; a plurality of guide rods, equal in number to said feeler members, slidably supported in said guide bar with each guide rod in opposed relationship with one of the feeler members; stop means on the rear ends of the guide rods for limiting the forward travel of the guide rods in the guide bar; means pivotally connecting the forward ends of the guide rods with the rear ends of the feeler members with the guide rods projecting downwardly and forwardly of the guide bar in trailing relationship with the feeler members whereby upward movement of the feeler members causes rearward sliding movement of the guide rods in the guide bar; an actuating lever fulcrumed on said header; means connecting one end of said actuating lever with said power means and biasing the other end of said lever into engagement with one of said feeler members for actuating the power means to raise and lower the header in response to upward and downward movement of the feeler members about the axis of said transverse rod.

5. An agricultural combine as defined in claim 4 wherein said power means includes a control valve having a moveable operating spool, and further including a hand lever pivoted on the main body and having an arm engaged with said spool for actuating the control valve to raise and lower the combine, a cam mounted for free rotation about the pivotal axis of said lever, said connecting means comprising a cable having one end connected with said actuating lever and its other end connected with said cam, spring means biasing said cam to apply tension to said cable, and means for releasably locking said cam to said hand lever whereby said spool is actuated by rotation of the cam against said spring in response to pivotal movement of the feeler members, and said automatic control means can be overridden by manual operation of the hand lever.

6. The construction of claim 5 further including means for selectively locking said hand lever out of engagement with said cam to permit manual operation only of the header.

7. The construction of claim 5 further including an overload shock spring assembly in said cable for absorbing sudden changes in tension on said cable.

References Cited

UNITED STATES PATENTS

| 2,750,727 | 6/1956 | Wright | 56—208 |
| 3,088,264 | 5/1963 | Sallee | 56—210 |
| 3,163,974 | 1/1965 | Mack | 56—214 |

RUSSELL R. KINSEY, *Primary Examiner.*